United States Patent
Smith et al.

(10) Patent No.: US 10,216,385 B2
(45) Date of Patent: Feb. 26, 2019

(54) GROUP RADIO CONTROL

(71) Applicant: International Business Machines Corporation, Armonk, NY (US)

(72) Inventors: Maria E. Smith, Davie, FL (US); Jie Z. Zeng, Palmetto Bay, FL (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 14/800,779

(22) Filed: Jul. 16, 2015

(65) Prior Publication Data

US 2015/0317072 A1    Nov. 5, 2015

Related U.S. Application Data

(63) Continuation of application No. 11/023,318, filed on Dec. 27, 2004, now Pat. No. 9,098,149.

(51) Int. Cl.
| | |
|---|---|
| *G06F 3/048* | (2013.01) |
| *G06F 3/0484* | (2013.01) |
| *G06F 3/0482* | (2013.01) |
| *G06F 3/042* | (2006.01) |

(52) U.S. Cl.
CPC ........ *G06F 3/04845* (2013.01); *G06F 3/0428* (2013.01); *G06F 3/0482* (2013.01); *G06F 3/04842* (2013.01); *G06F 3/04847* (2013.01)

(58) Field of Classification Search
CPC .. G06F 3/04845; G06F 3/0428; G06F 3/0482; G06F 3/04842; G06F 3/04847
See application file for complete search history.

(56) References Cited

U.S. PATENT DOCUMENTS

| | | | |
|---|---|---|---|
| 5,603,034 A | 2/1997 | Swanson | |
| 5,721,848 A | 2/1998 | Joseph | |
| 5,793,368 A | 8/1998 | Beer | |
| 5,818,445 A | 10/1998 | Sanderson et al. | |
| 6,988,895 B1 * | 1/2006 | Lamarche | G09B 7/00 434/323 |
| 7,143,359 B2 * | 11/2006 | Aggarwal | G06F 17/30887 715/760 |
| 7,444,672 B2 * | 10/2008 | Ellmore | G06Q 20/108 705/42 |
| 7,689,931 B2 * | 3/2010 | Koga | G06F 1/16 715/812 |
| 8,959,142 B2 * | 2/2015 | D'Aurelio | G06F 17/30893 709/203 |
| 9,098,149 B2 * | 8/2015 | Smith | G06F 3/0482 |
| 2003/0043192 A1 | 3/2003 | Bouleau | |
| 2004/0056837 A1 * | 3/2004 | Koga | G06F 1/16 345/156 |

FOREIGN PATENT DOCUMENTS

| | | |
|---|---|---|
| WO | WO 96/15492 | 5/1996 |
| WO | WO 99/35570 | 7/1999 |

* cited by examiner

*Primary Examiner* — David Phantana-angkool
(74) *Attorney, Agent, or Firm* — Steven M. Greenberg, Esq.; Shutts & Bowen LLP

(57) ABSTRACT

A method, system and apparatus for grouped radio controls. A grouped radio control can include a listing of elements, each element having a specified grouping. The grouped radio control also can include grouping logic programmed to insert elements into, delete elements from, and select elements within the listing. Finally, a grouped radio control can include a grouped radio control interface configured to accept interface events for processing in the grouping logic.

10 Claims, 3 Drawing Sheets

GROUP RADIO CONTROL

CROSS-REFERENCE TO RELATED APPLICATION

This application is a Continuation of U.S. application Ser. No. 11/023,318, filed Dec. 27, 2004, now allowed, which is incorporated herein by reference in its entirety.

BACKGROUND OF THE INVENTION

Statement of the Technical Field

The present invention relates to the field of graphical user interfaces and more particularly to the manipulation of a check list in a graphical user interface.

Description of the Related Art

The conventional graphical user interface (GUI) has been widely used for many years. The primary function of the GUI includes providing visual controls with which the end-user can interact with an underlying software application. Though the common GUI includes many stock visual controls, a select few visual controls can be combined to accommodate most computer-human interactions required by a software application.

For example, the static text box control can be used to present text to the end-user while an edit box can permit the user to provide textual input to the software application. A radio button control can provide for the exclusive selection of an element from among a field of elements, while a checklist box can provide for the non-exclusive selection of elements from among a field of elements. Notably, many visual controls can be combined to produce a composite visual control.

It is common for software applications to display multiple choice data and corresponding selections among the multiple choice data using radio buttons, check boxes or list boxes. Sometimes, however, a software application may need to display dynamically changing groups of multiple choice data and corresponding selections. In the latter circumstance, end users must be able to insert groups of choices, remove groups of choices, and edit choices within a group. Yet, the number of groups provided may also be large thereby requiring a scrolling mechanism enabling the user to see all of the groups.

In text-to-speech software applications, the problem of grouping multiple choices in a GUI can be particularly acute. Specifically, before building Concatenative Text-to-Speech (CTTS) Voice, which is a database containing pre-recorded segments of natural speech and used for concatenative synthesis, a pronunciation dictionary can be created containing all words from a training script. Yet, there may be multiple entries for a given word in the dictionary since words may have more than one pronunciation, e.g. "read" may be pronounced as "reed" or "red". The CTTS Voice building process typically can include a step where word pronunciations can be aligned to corresponding recordings. Accordingly, where multiple entries exist for a word, the closest matching word can be selected.

Unfortunately, the foregoing process is not always accurate and can require a manual override of the automated selection of a closest matching word. Thus, a highly desirable application to correct the selections made by the system would:

1) display all the words in a training script sentence
2) display all possible pronunciations for each word
3) display the automatically selected pronunciations for each word
4) enable user to select a different pronunciation
5) add a new pronunciation
6) delete invalid pronunciations
7) add a new word to the sentence (e.g. speaker unintentionally recorded an extra word)
8) delete a word from the sentence (e.g. speaker skipped a word in the recording)

Presently, it is common practice to use standard radio buttons and group controls to display multi-choice data and the current selection. However, it is very difficult to dynamically change, add and remove those controls from a grouping along with the data associated with the controls.

SUMMARY OF THE INVENTION

The present invention addresses the deficiencies of the art in respect to radio controls in a GUI and provides a novel and non-obvious method, system and apparatus for grouped radio controls. A grouped radio control can include a listing of elements, each element having a specified grouping. The grouped radio control also can include grouping logic programmed to insert elements into, delete elements from, and select elements within the listing. Finally, a grouped radio control can include a grouped radio control interface configured to accept interface events for processing in the grouping logic.

In one aspect of the invention, the specified grouping can include a group identifier. Specifically, the specified grouping further can include a field identifier associated with each of the elements. Also, the specified grouping yet further can include a selection identifier associated with each of the elements. Finally, the grouped radio control can be disposed in a text-to-speech application graphical user interface.

A method for grouping elements in a radio control can include associating one or more elements in the control with corresponding grouping identifiers. Also, the method can include rendering the elements in discrete groupings in the radio control according to the grouping identifiers. In either case, the associating step can include associating each of one or more elements in the control with each of a corresponding field identifier, grouping identifier and selection identifier.

In one aspect of the invention, the method can include dynamically inserting a new element in a grouping in the control by modifying the field identifiers for all other elements in the grouping in order to accommodate the new element. Similarly, the method can include inserting a new element in a new grouping in the control by creating the new grouping and by modifying the grouping identifiers for all other elements in the control. Finally, the method can include dynamically deleting an existing element in a grouping in the control by removing the existing element from a designated grouping and by modifying the field identifiers for all remaining elements in the grouping.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for grouping radio controls in a GUI. In accordance with the present invention, a grouped radio control can include a listing of radio controlled elements configured for rendering in a GUI. Individual groupings of radio control elements can be managed separately as a discrete radio control. Logic can be included in the grouped radio control to permit the insertion into and deletion from the grouped radio control of selected radio control elements. In particular, the logic can associate each selected radio control element with a group such that additions to and deletions from the control can be managed in terms of the different groupings of the grouped radio control.

Figure 1:
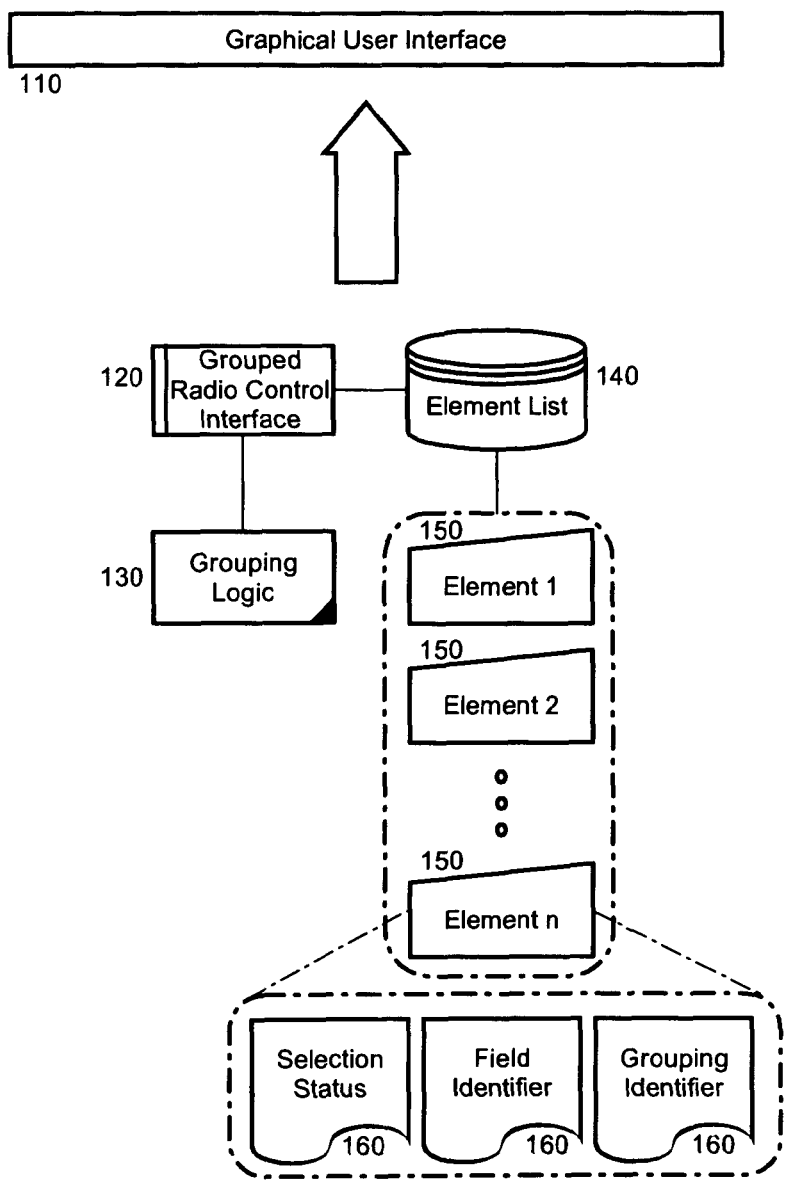
FIG. 1 is a schematic illustration of a GUI configured for grouping radio controls in accordance with the present invention.

In further illustration, FIG. 1 is a schematic illustration of a GUI configured for grouping radio controls in accordance with the present invention. As shown in FIG. 1, a GUI 110 can be configured to include at least one grouped radio control interface 120. The radio control interface 120 can include both an element list 140 and grouping logic 130. Specifically, the element list 140 can include a multiplicity of elements 150 to be rendered within the grouped radio control interface 120. The grouping logic 130, in turn, can process the element list 140 to selectively group individual ones of the elements 150 in different groupings. The grouping logic 130 further can include programming to manage the selection, insertion and deletion of the elements to and from the element list 140.

Notably, each of the elements 150 can include a selection status field 160, a field identifier 170 and a grouping identifier 180. The selection status field 160 can indicate whether or not the associated one of the elements 150 has been selected within its own grouping. The field identifier 170, in turn, can provide a unique identifier for the associated one of the elements 150. Finally, the grouping identifier 180 can indicate which of the discrete grouping contains the associated one of the elements 150. Using these three identifiers, the elements 150 can be dynamically arranged into different groupings by the grouping logic 130.

Figure 2:
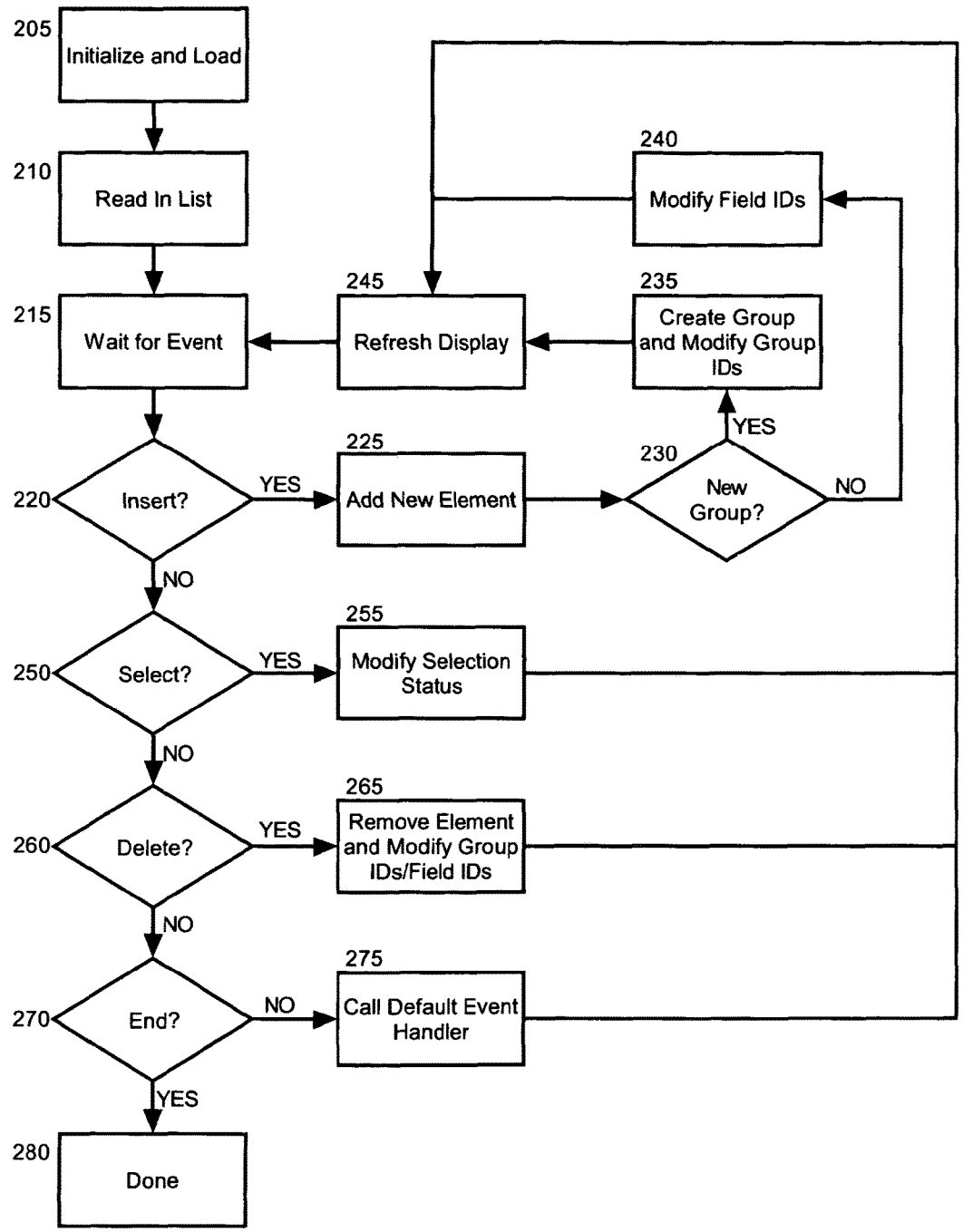
FIG. 2 is a flow chart illustrating a process for grouping radio controls in the GUI of FIG. 1; and, FIG. 3 is a pictorial illustration of a grouped radio control disposed in a GUI.

In more particular illustration, FIG. 2 is a flow chart illustrating a process for grouping radio controls in the GUI of FIG. 1. Beginning in block 205, the group radio control can be initialized and associated bitmaps can be loaded for use in the group radio control. In block 210, the listing of elements can be loaded and each element in the listing of elements can be assigned to a specific grouping based upon the group identifier associated with the element. Finally, the selection status for each element in each grouping can be set according to the selection identifier.

In block 215, the group radio control can await a user interface event such as a mouse or keyboard driven event. If in decision block 220, the event indicates an intent to insert a new element into the group radio control, in block 225 the new element can be inserted into the list. In decision block 230, it can be determined whether the new element is to be assigned to an existing group or to a new group. If it is determined that the new element is to be assigned to an existing group, in block 240 the field identifiers for the other elements in the existing group can be modified to accommodate the new element. Otherwise, in block 235 the new group can be created and the group identifiers for the elements in the list can be modified to accommodate the new group. In both cases, in block 245 the display of the group radio control can be refreshed to reflect to insertion before the process can repeat in block 215.

Returning now to decision block 220, if it is determined that the event is not an event associated with an insertion request, in decision block 250 it can be determined whether the event is associated with a selection event. If so, in block 255 the selection status for the selected element can be set and the selection state for all other elements in the same grouping can be reset. Otherwise, in decision block 260 it can be determined whether the event is associated with a deletion event. If so, the selected element can be removed from the list and the group and field identifiers can be adjusted as appropriate. Finally, in decision block 270, if the event is not an event indicating the end of the operation of the group radio control, a default event handler can be called in block 275. Else, the process can end in block 280.

Figure 3:
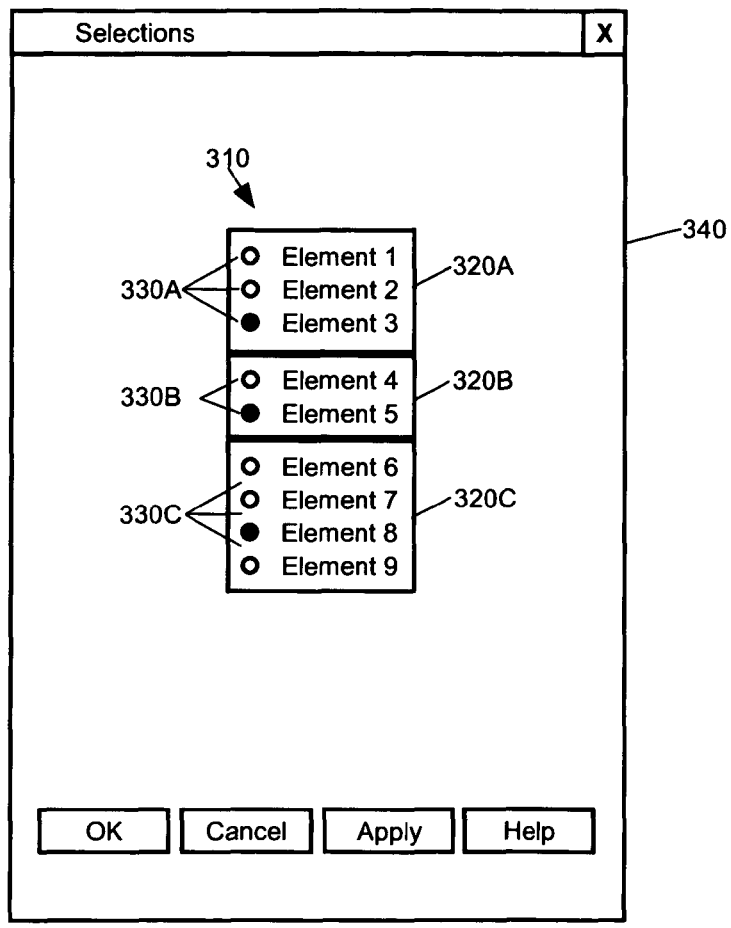

The operation of the methodology of the present invention can produce a radio control having one or more groupings which can be dynamically modified through insertion, deletion and selection operations in the group radio control logic. The resulting grouped radio control can appear as shown in FIG. 3. FIG. 3 is a pictorial illustration of an exemplary grouped radio control 310 disposed in a GUI 340. The exemplary grouped radio control 310 can include one or more groupings 320A, 320B, 320C which can include one or more elements 330A, 330B, 330C. In any one grouping, only one of the elements 330A, 330B, 330C can be selected. Yet, the composition and number of elements 330A, 330B, 330C and groupings 320A, 320B, 320C can change dynamically through the manipulation of the listing (not shown) of the grouped radio control 310.

The present invention can have particular application voice building in the field of text-to-speech processing. For example, when modifying an existing lexeme in a voice building process, lexemes can be inserted, removed or selected in a listing which aligns lexemes with portions of a recorded speech waveform. By permitting the insertion, removal and selection of lexemes in the list, the automated alignment of a lexeme with a phonetic pronunciation can be overridden by the end user. Similarly, when a word is inserted into or removed from training text, a group of the lexemes associated with the word can be inserted into or removed from the group radio control to allow the end user to select a correct lexeme. Thus, the present invention can simplify the process of voice recording verification, lexeme correction and script editing.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A non-transitory machine readable storage medium having stored thereon a computer program for grouping elements in a radio control, the computer program comprising a routine set of instruction which when executed by a computer causes the computer to perform the steps of:
   configuring a graphical user interface (GUI) in a memory of the computer with a grouped radio control comprising an element list of different radio button elements to be rendered within the grouped radio control;
   assigning each of the radio button elements in the element list of different radio button elements to a corresponding one of a selection of grouping identifiers; and,
   rendering groups of different radio button elements in the radio control according to said grouping identifiers and permitting selection of only one radio button element in each of the groups of different radio button elements.

2. The non-transitory machine readable storage medium of claim 1, wherein the computer program comprising the routine set of instruction for causing the computer to perform the step of assigning each of the radio button elements in the element list to the corresponding one of the selection of grouping identifiers further comprises additionally assigning each of the different radio button elements in the element list of different radio button elements with each of a corresponding field identifier and a selection identifier.

3. The non-transitory machine readable storage medium of claim 1, further comprising computer program comprising the routine set of instruction for causing the computer to perform the step of dynamically inserting a new element in a grouping in the grouped radio control by modifying field identifiers for all other different radio button elements in said grouping in order to accommodate said new radio button element.

4. The non-transitory machine readable storage medium of claim 1, further comprising computer program comprising the routine set of instruction for causing the computer to perform the step of dynamically inserting a new radio button element in a new grouping in the grouped radio control by creating said new grouping and by modifying the grouping identifiers for all other different radio button elements in the grouped radio control.

5. The non-transitory machine readable storage medium of claim 1, further comprising computer program comprising the routine set of instruction for causing the computer to perform the step of dynamically deleting an existing radio button element in a grouping in the grouped radio control by removing the existing radio button element from a designated grouping and by modifying field identifiers for all remaining different radio button elements in the designated grouping.

6. A system for providing a grouped radio control, comprising:
   a computer with at least one processor and a memory;
   a graphical user interface (GUI) executing in the memory of the computer;
   an element list of different radio button elements to be rendered within the grouped radio control, the element list of different radio buttons being stored in the memory of the computer;
   grouping logic executing in the memory of the computer, the grouping logic comprising program code that when executed by the at least one processor of the computer causes the computer to assign each of the different radio button elements in the element list of different radio button elements to a corresponding one of a selection of grouping identifiers, and to render groups of different radio button elements in the grouped radio control in the GUI according to said grouping identifiers and to permit selection of only one radio button element in each of the groups of different radio button elements.

7. The system of claim 6, wherein the program code of the grouping logic that causes the computer to assign each of the different radio button elements in the element list of different radio button elements to the corresponding one of the selection of grouping identifiers further comprises program code that causes the computer to additionally assigning each of the different radio button elements in the element list of different radio button elements with each of a corresponding field identifier, and selection identifier.

8. The system of claim 6, wherein the grouping logic further comprises program code that causes the computer to dynamically insert a new element in a grouping in the grouped radio control by modifying field identifiers for all other different radio button elements in said grouping in order to accommodate said new radio button element.

9. The system of claim 6, wherein the grouping logic further comprises program code that causes the computer to dynamically insert a new radio button element in a new grouping in the grouped radio control by creating said new grouping and by modifying the grouping identifiers for all other different radio button elements in the grouped radio control.

10. The system of claim 6, wherein the grouping logic further comprises program code that causes the computer to dynamically delete an existing radio button element in a grouping in the grouped radio control by removing the existing radio button element from a designated grouping and by modifying field identifiers for all remaining different radio button elements in the designated grouping.

* * * * *